(12) United States Patent
Désorcy et al.

(10) Patent No.: US 6,454,312 B1
(45) Date of Patent: Sep. 24, 2002

(54) MULTI-SETTING CONNECTOR FOR SAP COLLECTION SYSTEM

(75) Inventors: Raynald Désorcy, Ste-Rosalie; Donald Lapierre, Beauce Sud, both of (CA)

(73) Assignee: Eratube Inc., Quebec (CA)

(*) Notice: Subject to any disclaimer, the term of this patent is extended or adjusted under 35 U.S.C. 154(b) by 0 days.

(21) Appl. No.: 09/335,716

(22) Filed: Jun. 18, 1999

(51) Int. Cl.[7] .................................................. F16L 41/00
(52) U.S. Cl. ........................... 285/197; 285/420; 248/62
(58) Field of Search ................................. 285/197, 420; 248/58, 62, 63, 343; 280/288.4; 188/24.11, 24.21

(56) References Cited

U.S. PATENT DOCUMENTS

| | | | | |
|---|---|---|---|---|
| 1,198,528 A | * | 9/1916 | Deitz | |
| 3,779,272 A | * | 12/1973 | Dunmire | 137/315 |
| 4,107,454 A | * | 8/1978 | Jakobsen | 174/135 |
| 4,108,190 A | * | 8/1978 | Carlson | 134/167 R |
| 4,768,741 A | * | 9/1988 | Logsdon | 248/62 |
| 4,966,397 A | * | 10/1990 | McKinnon | 285/197 |
| 5,221,064 A | * | 6/1993 | Hodges | 248/62 |
| 5,360,241 A | * | 11/1994 | Gundy | 285/197 |
| 5,460,415 A | * | 10/1995 | Lengauer et al. | 248/62 X |
| 5,746,401 A | * | 5/1998 | Condon | 248/62 |
| 6,102,341 A | * | 8/2000 | Ball | 248/58 |
| 6,113,039 A | * | 9/2000 | Riffle | 248/75 |

* cited by examiner

Primary Examiner—Teri Pham Luu
(74) Attorney, Agent, or Firm—Ogilvy Renault; Michel Sofia

(57) ABSTRACT

A multi-setting connector for connecting at least one secondary branch line to a main line of a sap collection system or network comprises a clip member, a sap conveying member and a pair of straps. The clip member by way of the straps is adapted to be firmly mounted around the main line with the sap conveying member extending through the clip member and into the main conduit and having tubular fittings for connection to the branch lines such that the branch lines are fluidly connected to the main line. The straps are detachable from the clip member with the clip member and the straps being adapted to be selectively connected together such as to adjust an effective length of the straps, typically depending on the outside diameter of the main line. More particularly, the clip member and the straps include co-operating male and female engagement members configured for mounting the straps at various relative positions with respect to the clip member. The clip member is also provided with elongated sockets on its outside surface adapted for detachably receiving a cable or a wire such that the connector may be suspended from such cable when it is desired to maintain the sap collection network, or at least part thereof, at an elevation from the ground.

11 Claims, 3 Drawing Sheets

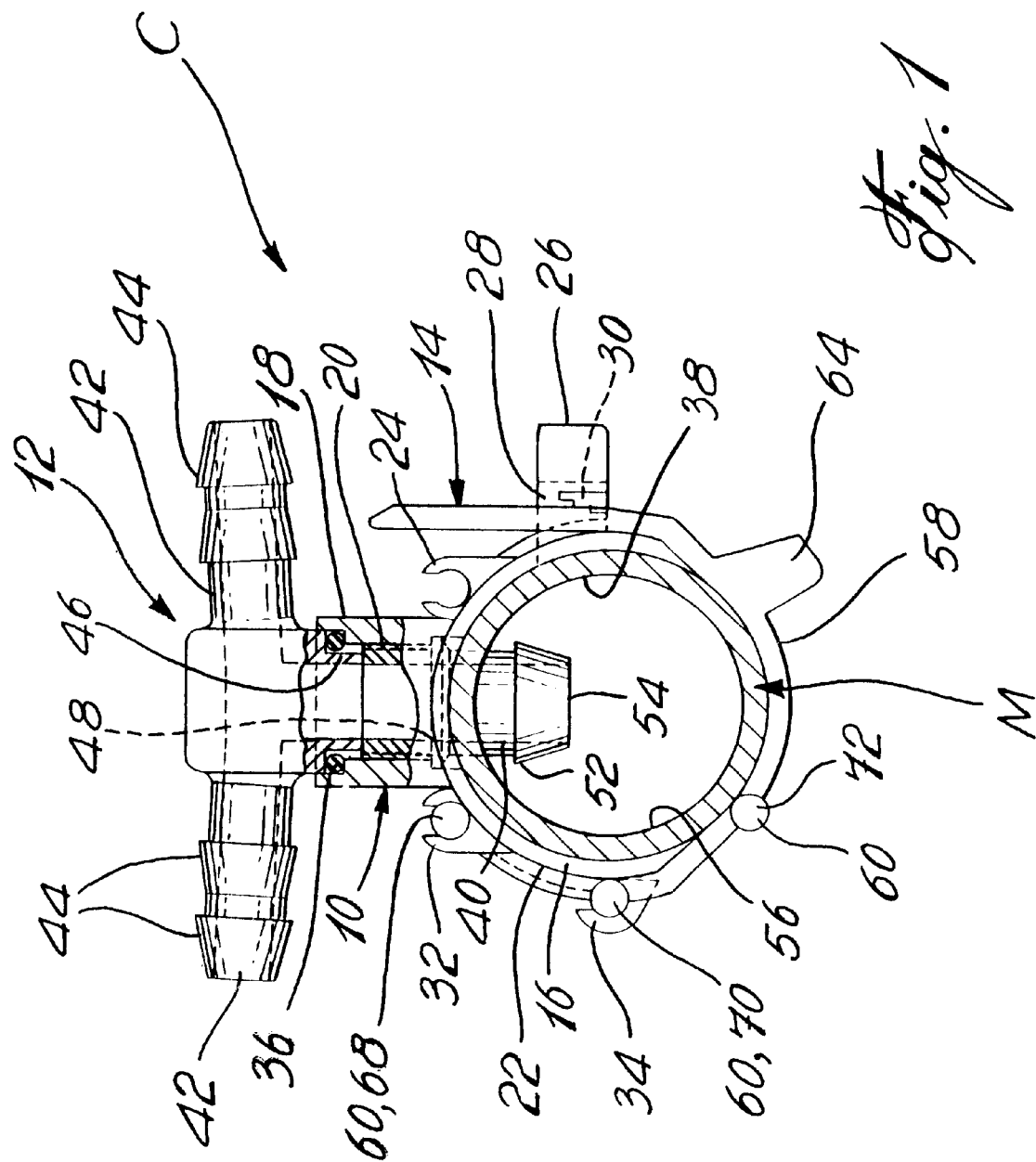

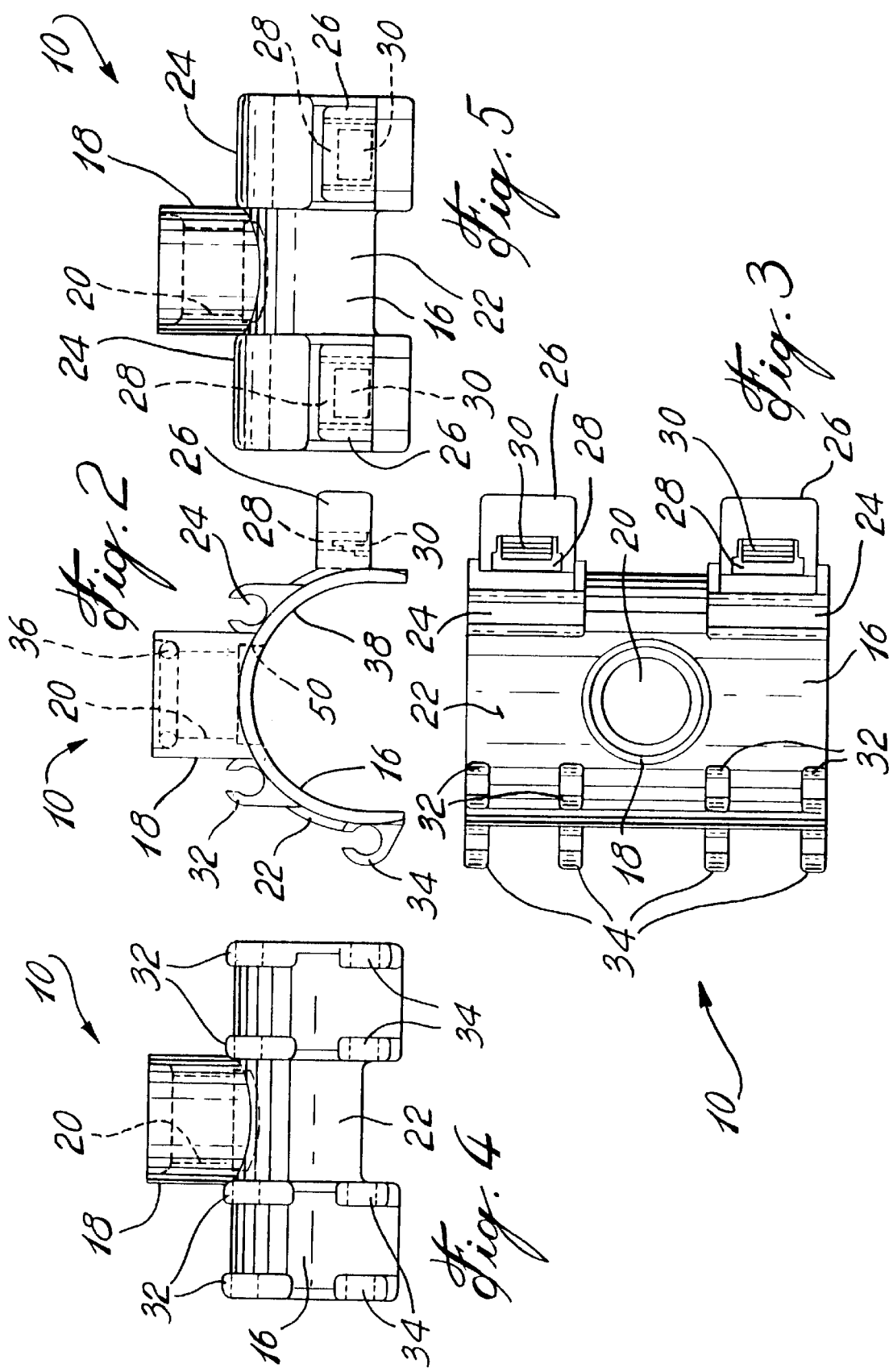

MULTI-SETTING CONNECTOR FOR SAP COLLECTION SYSTEM

BACKGROUND OF THE INVENTION

1. Field of the Invention

The present invention relates to sap collection systems and, more particularly, to a connector used, for instance, to connect one or two branch lines to a main line.

2. Description of the Prior Art

In the maple sugar industry, various sap collecting devices or spouts have been used to collect sap from trees such as maple trees. These spouts are introduced in holes defined in the trunks of the maple trees such that sap from the maple trees drip through the tubular spouts and are collected in various manners. For example, originally, metal buckets were suspended from the tree trunks below the spouts such that the maple sap would drip into these buckets, and then the buckets would be manually poured into a large container mounted on a vehicle. Obviously, this tedious task of periodic tree-to-tree collection was costly and conduit systems were developed for conveying the sap dripping from the spouts to a series of secondary and main lines up to the sap treatment center.

For instance, U.S. Pat. No. 2,877,601 issued to Griggs on Mar. 17, 1959 discloses an arterial network extending from tree to tree to the collection point. This network is basically made up of a series of spouts, a series of secondary or branch lines connecting the spouts to a main conduit when itself is connected downstream to a sap collecting center. In Griggs, the branch lines are connected to the main line by tubes connected to the downstream end of the branch lines and extending through the sidewall of the main line such that sap passes through the branch line, the tube and into the main line.

Various other connectors have been developed for connecting branch lines to a main line, including connectors having semi-cylindrical sidewalls adapted to be mounted around the main line, with a tubular T member extending outwardly from this semi-cylindrical sidewall and in fluid communication with the main conduit by way of a holed defined in the latter and a tubular extension extending inwardly of the semi-cylindrical sidewall from the T-shaped member. The outside free ends of the T-shaped member are each adapted for connection to a branch line such that sap passing through the branch line goes through the T-shaped connector and into the main conduit. Adjustable bands, straps or metal wires are used to secure these connectors to the main line by extending around the semi-cylindrical wall of the connector and around the main conduit.

The main conduits can have various diameters and a number of different connectors are required for accommodating such various diameters in the main lines. For instance, the semi-cylindrical walls may be manufactured with different radii as the flexibility thereof is limited an cannot accommodate the various sizes of main lines. Furthermore, the straps or bands used to attach the connector to the main line need to have various lengths in view of the varying circumferences of the main lines.

SUMMARY OF THE INVENTION

It is therefore an aim of the present invention to provide a novel connector for connecting at least two conduits together.

It is also an aim of the present invention to provide a novel connector for connecting a main line of a sap collection system to at least one branch line thereof.

It is a further aim of the present invention to provide a connector for connecting a mainline of a sap collecting system to at least one branch line thereof, the connector being adapted to be used on main lines of various outside diameters.

It is a still further aim of the present invention to provide a connector for sap collection systems provided with an elongated socket for engaging a wire or a cable such such that at least part of the sap collection system may be suspended from the wire or cable.

It is a still further aim of the present invention to provide a method for mounting a connector to an elongated member.

Therefore, in accordance with the present invention, there is provided a connector for connecting in fluid communication a first conduit with at least a second conduit, comprising a clip member, a fluid conveying member and at least one strap, said clip member being adapted to be positioned against the first conduit with said fluid conveying member being adapted to extend at a first end thereof into the first conduit and to be connected at a second end thereof to the second conduit such that the first and second conduits are in fluid communication by way of said fluid conveying member, said strap having opposed ends adapted to be connected to said clip member for securing said clip member against the first conduit, and said strap being detachable mounted to said clip member.

Also in accordance with the present invention, there is provided a connector for connecting in fluid communication a first conduit with at least a second conduit, comprising a clip member, a fluid conveying member and at least one strap, said clip member being adapted to be positioned against the first conduit with said fluid conveying member being adapted to extend at a first and thereof into the first conduit and to be connected at a second end thereof to the second conduit such that the first and second conduits are in fluid communication by way of said fluid conveying member, said strap having opposed ends adapted to be connected to said clip member for securing said clip member against the first conduit, wherein said clip member and said strap include cooperating attachment means adapted to provide at least two different relative positions between said clip member and said strap.

Further in accordance with the present invention, there is provided a connector for connecting in fluid communication a first conduit with at least a second conduit, comprising a clip member and a fluid conveying member, said clip member being adapted to be positioned against the first conduit with said fluid conveying member being adapted to extend at a first end thereof into the first conduit and to be connected at a second end thereof to the second conduit such that the first and second conduits are in fluid communication by way of said fluid conveying member, mounting means being provided for securing said clip member against the first conduit, said clip member being provided with wire holding means adapted to be secured to a wire or the like for suspending said connector therefrom.

Still further in accordance with the present invention, there is provided a method for mounting a connector around an elongated member, comprising the steps of: a) providing a clip member and a strap having proximal and distal ends; b) connecting the distal end of the strap to the clip member at a selected one of at least two different relative positions with respect the clip member for adjusting a useful length of the strap in view of a size of the elongated member; and c) securing the distal end of the strap to the clip member such that the strap and clip member are securely mounted to the elongated member.

BRIEF DESCRIPTION OF THE DRAWINGS

Having thus generally described the nature of the invention, reference will now be made to the accompanying drawings, showing by way of illustration a preferred embodiment thereof, and in which:

FIG. 1 is a side elevational view of a multi-setting connector in accordance with the present invention which is shown mounted around a main line, the main line being shown in cross-section;

FIG. 2 is a side elevational view of a clip member of the connector of FIG. 1;

FIG. 3 is top plan view of the clip member of FIG. 2;

FIG. 4 is a front elevational view of the clip member of FIG. 2;

FIG. 5 is a rear elevational view of the clip member of FIG. 2;

DESCRIPTION OF THE PREFERRED EMBODIMENTS

Figure 6:
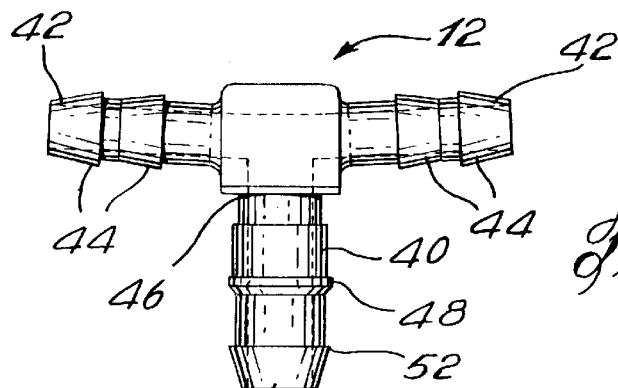
FIG. 6 is a side elevational view of a sap conveying member of the connector of FIG. 1.

In accordance with the present invention, FIG. 1 illustrates a multi-setting connector C which is mounted around a main line or conduit M. The connector C comprises a clip member 10, a sap conveying member 12 and a pair of similar straps 14. While also referring to FIGS. 2 to 5 which show the clip member 10 in detail, the clip member 10 includes a substantially semi-cylindrical wall 16 adapted to extend around the outer wall of the main line M. A socket 18 integrally extends radially outwardly of the semi-cylindrical wall 16 and defines therein a through opening 20. On an outer surface 22 of the semi-cylindrical wall 16, there is defined on a first side of this outer surface 22 a pair of elongated sockets 24 through which a cable or a wire (not shown) can extend such that the connector C may be suspended from this cable or wire for retaining, for instance, the main line M (and the branch lines) at a distance from the ground. Indeed, the wire or cable can be secured such as to extend above the ground and thus retain the main line M and secondary branch lines (not shown) of the sap conveying network above ground. Below the elongated sockets 24 which have the shape of a horizontal cylinder defining a longitudinal cut-out at its upper end, the outer surface 22 of the semi-cylindrical wall 16 is provided with a pair of ratchet locking members 26 which each define an opening 28 therein with a ratchet arm 30 extending in the opening 28.

On the other side of the outer surface 22 of the semi-cylindrical wall 16, there are provided, as best seen in FIGS. 2 to 4, two sets of discrete and spaced apart upper and lower pairs of clamps 32 and 34. More particularly, on each side of the socket 18 there is provided one upper pair of clamps 32 and one lower pair of clamps 34. Each clamp 32 and 34 is shaped as an open sided ring, as best seen in FIGS. 2 and 3.

The clip member 10 also includes an O-ring 36 disposed in an upper part of the socket 18 and a semi-cylindrical rubber gasket (not shown) extending along an inner surface 38 of the semi-cylindrical wall 16.

The sap conveying member, as best seen in FIG. 6, includes a main tube 40 and a pair of secondary tubes 42 in fluid communication with the main tube 40. Each secondary tube 42 defines at least a pair of consecutive frusto-conical flanges 44 such that ends of the branch lines (not shown) can be tightly connected around the secondary tubes 42 whereby sap conveyed by such branch lines passes through the secondary tubes 42, then through the main tube 40 and into the main line M. The main tube 40 is mounted to the socket 18 of the clip member 10 and extends, as seen in FIG. 1, inwardly past the inner surface 38 of the semi-cylindrical wall 16 of the clip member 10. The main line M defines a opening on its sidewall through which the main tube 40 of the sap conveying member 12 extends for ensuring fluid communication between the branch lines and the main line M. The main tube 40 extends through the aforementioned gasket (not shown) and into the main line M.

The annular shoulder 46 of the sap conveying member 12 is adapted to be in compressed engagement with the O-ring 36 and cooperate with the socket 18 for a tight seal between the clip member 10 and the sap conveying member 12. The main tube 40 defines an annular flange 48 which locks behind an enlarged area 50 of the opening 20 of the socket 16 for sewing the sap conveying member 12 to the clip member 10. An annular edge 52 defined by a frusto-conical free end 54 of the main tube 40 helps retain the aforementioned gasket (not shown) in close proximity with the semi-cylindrical wall 16 and may further engage an inside wall 56 of the main line M for further engagement of the connector C with the main line M (even though this is not the case in FIG. 1 where the annular edge 52 is spaced from the inside wall 56 of the main line M).

Figure 7A:
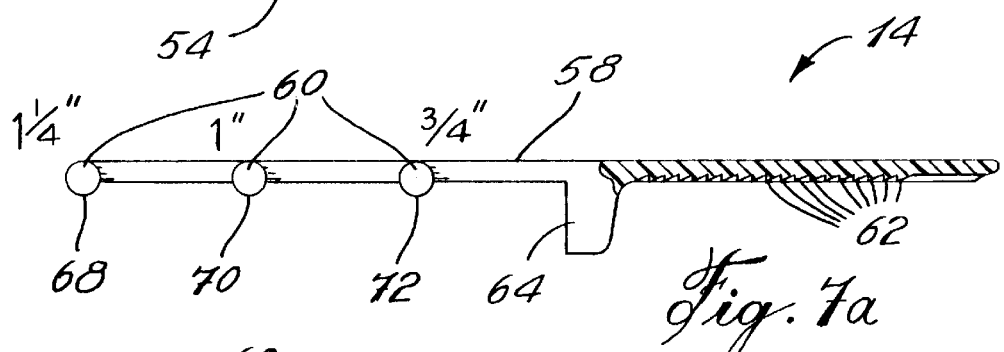
FIGS. 7a and 7b are respectively side elevational and bottom plan views of either one of the two straps of the connector of FIG. 1.
Figure 7B:
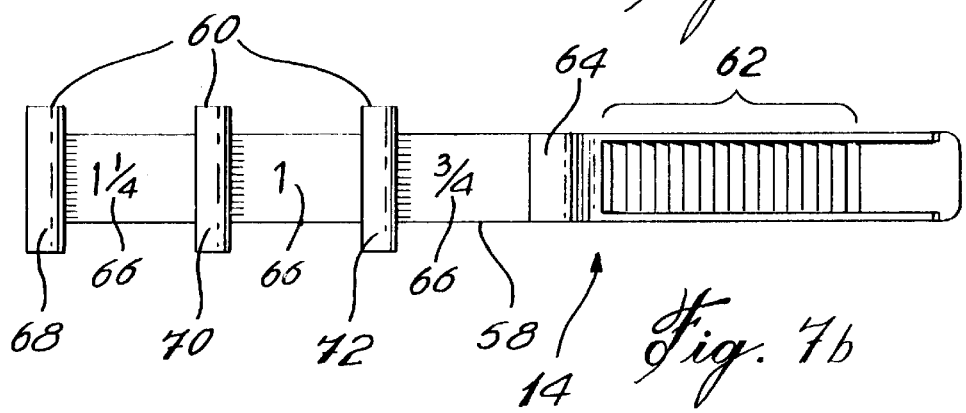

Now referring mainly to FIGS. 7a and 7b, each strap 4 includes an elongated flat body 58 provided, in the illustrated embodiment, with three discrete and spaced apart transversally oriented cylindrical male anchors 60 which extend outwardly past the longitudinal edges of the flat body 58, as best seen in FIG. 7b. The flat body 58 also defines a series of transversally defined and equally spaced apart parallel ratchet teeth 62 adapted to cooperate with the ratchet arm 30 provided in the locking member 26 of the clip member 10. The flat body 58 also includes a finger engaging extension 64. Markings 66 are provided on the flat body 58 for each of the cylindrical male anchors 60 for assisting and identifying which of the male anchors 60 should be engaged with the upper and lower clamps 32 and 34 depending on the outside diameter of the main line M. In FIG. 7b, the markings are for main lines M having ¾", 1" and 1 ¼".

In use, the sap conveying member 12 and the clip member 10 are fixedly secured together with the clip member 10 being ready to be positioned around the main line M and with the secondary tubes 42 of the sap conveying member being ready for connection to the branch lines. It is understood that there could be a single secondary tube 42 or more than two such tubes in addition to the pair of secondary tubes 42 shown in the drawings as this depends on the number of branch lines to be connected to the main line M by way of the present connector C. The elongated sockets 24 are also ready to be engaged to an overhead cable or wire for suspending the connector C and the maon line M therefrom and thus at a distance from the ground.

As to the straps 14, they are each selectively connected to the clip member 10 at various positions thereon in view of the outside diameter of the main line M. Indeed, one or two of the male anchors 60 will be engaged with one or both of the pairs of upper and lower clamps 32 and 34. For instance, for a longest effective or useful length of the straps 14, the distal male anchor 68 of each strap 14 will be engaged with a respective pair of lower clamps 34 and this to accommodate a large diameter main line M. For a much smaller diameter main line M, the proximal male anchor 72 will be engaged with the pair of upper clamps 32. Between these two settings, there are two intermediate positions, namely a first intermediate position where the distal male anchor 68 is engaged with the upper clamps 32 and with the intermediate male anchor 70 being engaged with the lower clamps 34, and a second intermediate position where the intermediate male anchor 70 is engaged to the upper clamps 32 and the proximal male anchor 72 is engaged with the lower clamps 34. Obviously, the number and the positions of the clamps 32 and 34 could be varied as there could be a single pair of clamps for each strap 14 as well as more than two pairs of clamps therefor. Similarly, each strap 14 could be provided with more or less than three cylindrical anchors 60.

Also, the detachable connection between the straps 14 and the clip member 10 could take other forms than the disclosed and illustrated co-acting male anchors 60 and upper lower clamps 32 and 34. For instance, the clip member 10 could define one or more outwardly extending members, for instance circular, while the straps 14 would define holes, for instance circular for engagement with the aforementioned outwardly extending members.

The detail end of the strap 14 defining the ratchet teeth 62 is then engaged through a respective one of the ratchet locking members 26 such that the ratchet teeth 62 engage the ratchet arm 30 of the locking member 26. The finger extension 64 is gradually brought closer to the locking member 26 while the ratchet teeth 62 slide, ratchet-like, through the opening 28 in the locking member 26 until the strap 14 tightly secures the clip member 10 to the main line M. Then engagement of the ratchet teeth 62 with the ratchet arm 30 subsequently prevents the strap from loosening in a well known manner. To tighten the strap 14 around the main line M, a user can grasp either manually or with a tool (e.g. pliers) the finger engaging extension 64 of the strap 14 and the locking member 26 of the clip member 10 such as to bring these two components closer together until the clip member 10 is firmly secured to the main line M.

Figure 8:
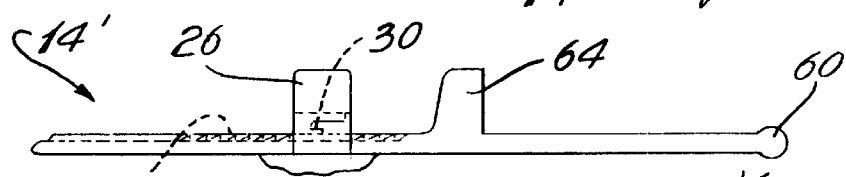
FIGS. 8 and 9 are alternate straps which are schematically shown engaged to a locking member of the clip member.
Figure 9:
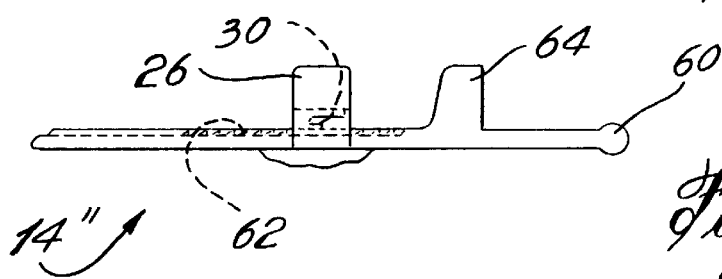

It is also noted that the straps 14 could be of different length to accommodate various diameters of main lines M. The detachability of the straps 14 from the clip member 10 allows, asides from various relative positions therebetween, for the straps 14 to be replaced in the event that they are damaged or in the event that they have to be cut for removing the connector C from the main line M, whereby new straps 14 can be used with the same clip member 10 thereby avoiding for the complete connector C to have to be discarded. A tool may be used to pry the ratchet arm 30 away from the strap 14 to thus disengage the ratchet teeth 62 of the strap 14 from the ratchet arm 30 for removing or loosening the strap 14 with respect to the locking member 26 of the clip member 10. FIGS. 8 and 9 show variant straps 14' and 14" of different length than strap 14, each with a single male anchor 60 (although there could obviously be more such made anchors)

The embodiments of the invention in which an exclusive property or privilege is claimed are defined as follows:

1. A connector for connecting in fluid communication a first conduit with at least a second conduit, comprising a clip member, a fluid conveying member and at least one strap, said clip member being adapted to be positioned against the first conduit with said fluid conveying member being adapted to extend at a first end thereof into the first conduit and to be connected at a second end thereof to the second conduit such that the first and second conduits are in fluid communication by way of said fluid conveying member, said strap having opposed ends adapted to be connected to said clip member for securing said clip member against the first conduit, and said strap being detachably mounted to said clip member, said opposed ends of said strap comprising a proximal end adapted to be first secured to said clip member by way of cooperating attachment means provided on said clip member and said strap, and a distal free end adapted to be thereafter locked to said clip member with sufficient tightness such that said clip member is firmly mounted to the first conduit, said attachment means comprising first and second connecting means provided on one and another of said strap and said clip member, there being at least two discrete and spaced apart of at least one of said first and second connecting means for providing at least two different relative positions of said proximal end of said strap with respect to said clip member and thus two different useful effective lengths of said strap, wherein said first and second connecting means comprise detachably engageable male and female members, and wherein said male members comprise cylindrical anchors and said female members comprise clamp means adapted to detachable receive said cylindrical anchors.

2. A connector as defined in claim 1, wherein at least two clamp means are provided on said clip member and at least two spaced apart cylindrical anchors are provided transversely on said strap.

3. A connector as defined in claim 2, wherein there are two said straps adapted to be mounted to opposite ends of said clip member such as to encircle the first conduit at longitudinally spaced locations thereon.

4. A connector as defined in claim 2, wherein said strap comprise an elongated body with said cylindrical anchors extending transversely thereof such that ends of said cylindrical anchors extending outwardly beyond longitudinal edges of said elongated body, wherein each clamp means comprise a pair of spaced clamps adapted to each detachably receive one of said ends of said cylindrical anchor.

5. A connector as defined in claim 4, wherein said pair of spaced clamps are aligned along an axis parallel to an axis of the first conduit.

6. A connector as defined in claim 1, wherein said fluid conveying member is rotatable with respect to said clip member and about a rotation axis of a section of said fluid conveying member extending into the main conduit, said rotation axis being perpendicular to a longitudinal axis of the main conduit at said clip member.

7. A connector for connecting in fluid communication a first conduit with at least a second conduit, comprising a clip member, a fluid conveying member and at least one strap, said clip member being adapted to be positioned against the first conduit with said fluid conveying member being adapted to extend at a first end thereof into the first conduit and to be connected at a second end thereof to be second conduit such that the first and second conduits are in fluid communication by way of said fluid conveying member, said strap having opposed ends adapted to be connected to said clip member for securing said clip member against the first conduit, and said strap being detachably mounted to said clip member, said opposed ends of said strap comprising a proximal end adapted to be first secured to said clip member by way of cooperating attachment means provided on said clip member and said strap, and a distal free end adapted to be thereafter locked to said clip member with sufficient tightness such that said clip member is firmly mounted to the first conduit, said attachment means comprising first and second connecting means provided on one and another of said strap and said clip member, there being at least two discrete and spaced apart of at least one of said first and second connecting means for providing at least two different relative positions of said proximal end of said strap with respect to said clip member and thus two different useful effective lengths of said strap, wherein said distal end of said strap is secured to said clip member by ratchet means, wherein said ratchet means comprise ratchet teeth defined at said distal end of said strap and a locking member provided on said clip member and defining an opening therethrough, said locking member comprising in said opening a ratchet arm adapted to interact with said ratchet teeth when said distal end of said strap is slid through said locking member until said strap and said clip member are tightly held against the first conduit thereby firmly mounting said connector to the first conduit, and wherein a finger engaging extension is provided on said strap intermediate said proximal and distal ends thereof, whereby said extension and said locking member may be grasped manually or with a tool and brought closer together for tightening said strap and said clip member around the first conduit.

8. A connector for connecting in fluid communication a first conduit with at least a second conduit, comprising a clip member and a fluid conveying member, said clip member being adapted to be positioned against the first conduit with said fluid conveying member being adapted to extend at a first end thereof into the first conduit and to be connected at a second end thereof to the second conduit such that the first and second conduits are in fluid communication by way of said fluid conveying member, mounting means being provided for securing said clip member against the first conduit, said clip member being provided with a wire holder adapted to be secured to a wire for suspending said connector therefrom, said wire holder comprising at least one elongated open-ended socket extending substantially parallel to an axis of the first conduit and through which the wire extends.

9. A connector as defined in claim 8, wherein said wire holding means comprise at least one elongated open-ended socket through which the wire extends.

10. A connector as defined in claim 8, wherein said socket has a shape of a horizontal cylinder longitudinally cut at an upper end thereof.

11. A connector as defined in claim 10, wherein there are provided a pair of spaced sockets disposed colinearly along an axis parallel to an axis of the first conduit.

* * * * *